US006619131B2

(12) United States Patent
Wälchli et al.

(10) Patent No.: US 6,619,131 B2
(45) Date of Patent: Sep. 16, 2003

(54) COMBINATION PRESSURE SENSOR WITH CAPACITIVE AND THERMAL ELEMENTS (75) Inventors: Urs Wälchli, Heiliqkreuz (CH); Per Björkman, Palsböle (FI); Rudolf Stocker, Azmoos (CH); Marcel Gantner, Weite (CH)

(73) Assignee: Unaxis Balzers AG, Balzers (LI)

( * ) Notice: Subject to any disclaimer, the term of this patent is extended or adjusted under 35 U.S.C. 154(b) by 0 days.

(21) Appl. No.: 10/099,053

(22) Filed: Mar. 14, 2002

(65) Prior Publication Data

US 2002/0129657 A1 Sep. 19, 2002

Related U.S. Application Data (63) Continuation of application No. 09/720,889, filed as application No. PCT/CH99/00325 on Jul. 16, 1999, now abandoned, and a continuation-in-part of application No. 09/116,666, filed on Jul. 16, 1998, now Pat. No. 5,962,791.

(51) Int. Cl.[7] .............................. G01L 9/12; G01L 20/12
(52) U.S. Cl. ........................................... 73/718; 73/755
(58) Field of Search ........................ 73/708, 718, 724, 73/753, 755; 361/283.1, 283.2, 283.3, 283.4

(56) References Cited

U.S. PATENT DOCUMENTS 4,934,190 A * 6/1990 Lee ........................... 73/204.26
5,610,340 A * 3/1997 Carr et al. ....................... 73/718

* cited by examiner

Primary Examiner—William Oen
(74) Attorney, Agent, or Firm—Notaro & Michalos P.C.

(57) ABSTRACT

A pressure sensor has a baseplate and a support plate with a membrane. Layers on the membrane and the support plate are connected to a circuit for capacitively measuring pressure to generate a first pressure signal. A thermal conductivity measuring element that generates a second pressure signal has a heating element connected to the baseplate adjacent the support plate at a location opposite from the membrane for protecting the membrane from thermal effects. The method uses the sensor apparatus to generate an output signal representing a measured result when the measured result is above a transition value, on the basis of the first pressure signal and, when the pressure falls below a threshold value, any offset of the first pressure signal is compensated in such a way that determination of the output signal on the basis of the first pressure signal leads to the same result as determination of the output signal on the basis of the second pressure signal.

23 Claims, 9 Drawing Sheets

COMBINATION PRESSURE SENSOR WITH CAPACITIVE AND THERMAL ELEMENTS

CROSS REFERENCE TO RELATED APPLICATIONS

This is a continuation of application No. 09/720,889 filed Mar. 2, 2001, now abandoned, which was a Rule 371 continuation of International Application PCT/CH99/00325, filed Jul. 16, 1999, and is a continuation-in-part of application No. 09/116,666, filed Jul. 16, 1998, which is now U.S. Pat. No. 5,962,791.

FIELD AND BACKGROUND OF THE INVENTION

The invention relates to a pressure sensor, a pressure measuring apparatus which comprises such a pressure sensor, and a method for monitoring the pressure in a chamber by means of such a pressure sensor or pressure measuring apparatus.

PRIOR ART

Known pressure sensors of the generic type (cf. for example EP-A-0 351 701) contain only a capacitive measuring element consisting of a support plate and a membrane, which carry electrically conductive layers. Although measurement can be carried out independently of the type of gas and with high accuracy between about $10^{-6}$ mbar and 10 bar by means of such measuring elements, the total range cannot be measured with a single measuring element. Furthermore, such pressure sensors always have an offset problem which can cause considerable inaccuracies, particularly in the longer term.

The use of pressure sensors which are in the form of a thermal conductivity measuring element, for example according to Pirani, is also known. In such pressure sensors, at least one heating element, usually a measuring wire, is electrically heated and the pressure is determined from the heating power, making use of the pressure-dependent thermal conductivity of the gas. In this way, it is possible to measure the pressure in a range between about $10^{-3}$ mbar and a few 100 mbar. Above a few 10 mbar, however, convective heat transmission predominates, so that the measurement is influenced there by gas flows and is highly position-dependent. Moreover, measurement by this method is always dependent on the type of gas. A heat-conduction sensor, including its evaluation circuit, can also be designed in such a way that it can be operated up to about $10^{-5}$ or max. $10^{-6}$ mbar, but in this case higher pressures above a few 10 mbar can no longer be reliably measured.

It is also known that so-called ionization sensors whose function is based on the measurement of the particle current density can be used for pressures below $10^{-2}$ mbar and, with further reduced accuracy, up to $10^{-1}$ mbar. A distinction is made between cold-cathode ionization vacuum gauges and those having a hot cathode. They are not capable of functioning in higher pressure ranges and are inaccurate from about $10^{-2}$ mbar. They are in principle dependent on the type of gas.

If it is intended to measure large pressure ranges, for example from about $10^{-6}$ mbar to about 100 mbar, it is usual to use at least two different, spatially separated pressure sensors which, independently of one another, are each also provided with devices for processing the measuring signal. Thus, for example, two or more pressure sensors which each contain a capacitive measuring element of the type described at the outset which is suitable for measuring a part of the range can be used. These and similar solutions are, however, expensive owing to the associated technical complexity. The distance between the measuring elements can lead to uncertainty in the measured result. Moreover, the offset problem persists even when a plurality of such measuring elements are used.

However, the combination of different pressure sensors in one apparatus is also known. Thus, EP-A-0 658 755 discloses a pressure measuring apparatus in which a Pirani heat-conduction measuring element and a cold-cathode measuring element are combined to give a pressure measuring apparatus, the former measuring an upper pressure range and the latter a lower one. Although the apparatus is compact and can measure the total above-mentioned measuring range, it is very inaccurate in the upper part.

The combination of a bellows-type mechanical measuring element with a Pirani-like thermal conductivity measuring element is also known (U.S. Pat. No. 3,064,478). Here, the corresponding pressure measuring apparatus is relatively inconvenient. Moreover, the spatial separation of the measuring elements may give rise to uncertainties in the measured result.

SUMMARY OF THE INVENTION

It is the object of the invention to provide a pressure sensor which covers a large measuring range—preferably from about $10^{-6}$ mbar to a few bar—and at the same time has a simple design and is compact and economical and insensitive to contamination. This object is achieved by the features in the claims.

It is also intended to provide a pressure measuring apparatus which is distinguished by the same characteristics as the pressure sensor according to the invention and which can be mounted easily, in any position and quickly, and furthermore a pressure measuring apparatus which combines these advantages with a very large measuring range with high accuracy and stability.

Finally, it is intended to provide a method for monitoring the pressure in a chamber, which is sufficiently accurate and stable in the long term over a large measuring range.

The pressure sensor according to the invention combines a capacitive measuring element with a thermal conductivity measuring element in compact, easily handled and economically producible form. The upper pressure range above about 0.1 mbar is covered by the capacitive measuring element independent of the type of gas, and the lower pressure range from about $10^{-6}$ mbar to about 10 mbar by the thermal conductivity measuring element, for example averaging being performed in the overlap region. Consequently, pressures between about 1 mbar and a few bar can be measured independently of the type of gas and with high accuracy (in general about 1%), while at the same time the measuring range extends down to about $10^{-6}$ mbar with generally sufficient accuracy of measurement.

The proximity of the two measuring elements ensures that they are always exposed to the same conditions. The pressure sensor is versatile and may also be formed in such a way that it is suitable for relative pressure measurements in the first-mentioned part of the measuring range. The arrangement can be designed to be small and compact, for example having a diameter of 35 mm or less. Regarding the thermal conductivity measurement, optimal operating behaviour can be realized in said pressure range with a heating element of small size, for example a short heating filament.

The pressure measuring apparatuses according to the invention have the advantages of the pressure sensor according to the invention and are convenient and easy to mount. When supplemented by suitable further measuring elements, they have a compact design and can measure the pressure in a wide measuring range with high accuracy.

The method according to the invention makes it possible to monitor the pressure in a chamber in a stable manner over a long time, in spite of the offset problems of capacitive measuring cells. These advantageous characteristics are displayed in particular in the monitoring of the pressure in locks since, owing to the cyclic pressure changes, the offset can be regularly compensated here.

BRIEF DESCRIPTION OF THE DRAWINGS

The invention is explained in more detail below with reference to Figures which illustrate only an embodiment.

FIG. 2b is a cross-section along line 2b—2b in FIG. 2a;

FIG. 3b is a longitudinal section taken along line 3b—3b in FIG. 3a;

DESCRIPTION OF THE PREFERRED EMBODIMENTS

The pressure sensor according to the invention is arranged in a vessel or a chamber and (FIG. 1) is designed in principle so that a capacitive measuring element having a capacitance C whose value is dependent on the gas pressure is arranged between the earth connection $A_0$ and a capacitor connection $A_c$. Its value is monitored in a known manner by means of a suitable evaluation circuit, which derives a first pressure signal from it. The first pressure signal is derived by means of an essentially linear characteristic from the original value reproducing the value of the capacitance C. The offset which usually occurs in the case of capacitive measuring elements and impairs the long-term stability can be compensated by a method described further below.

Figure 1:
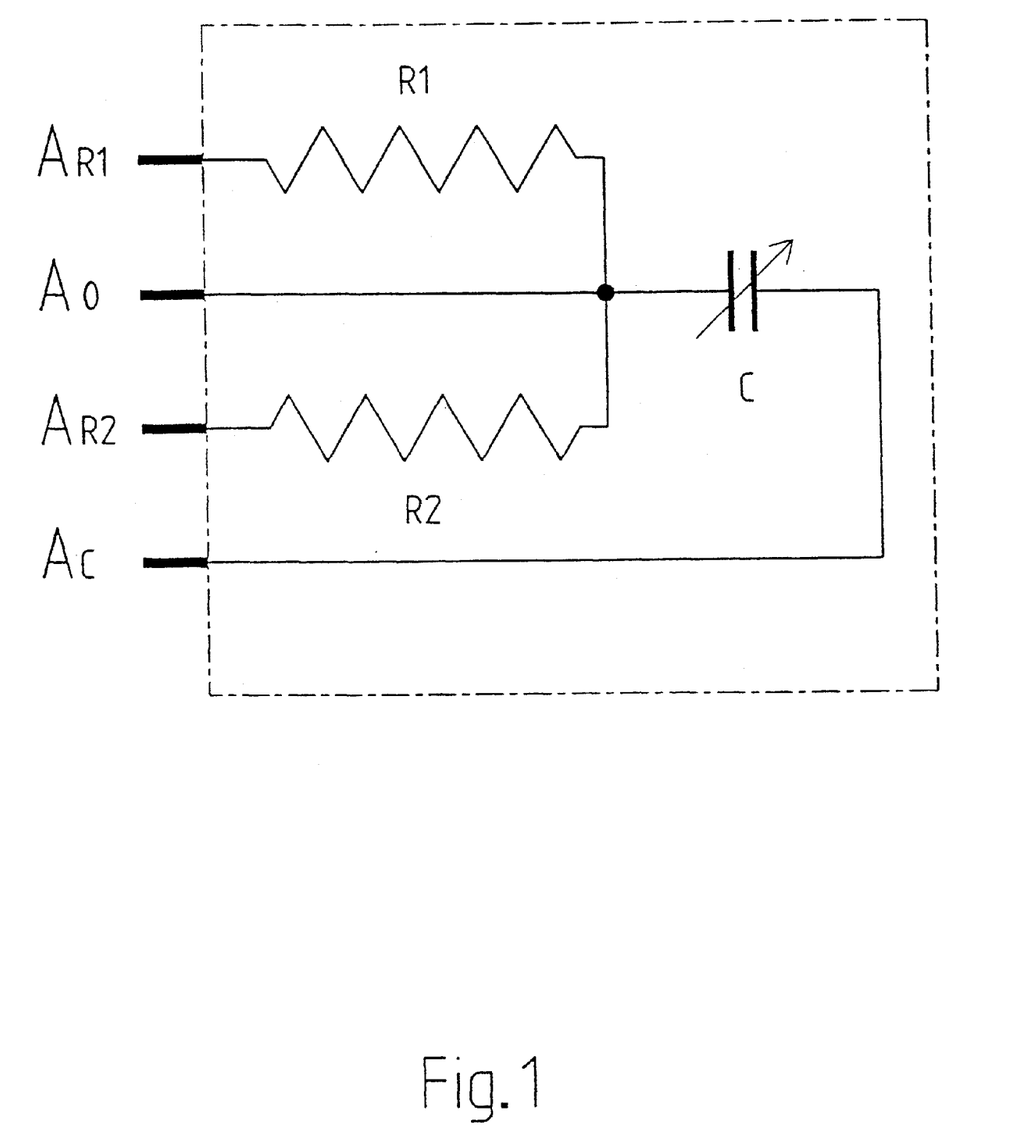
FIG. 1 is a circuit diagram which schematically illustrates the design of a pressure sensor according to the invention.

A first resistor $R_1$ and a second resistor $R_2$, which represent heating elements of a thermal conductivity measuring element, are arranged between the earth connection $A_0$ and a first resistor connection $A_{R1}$ and a second resistor connection $A_{R2}$, respectively. The resistors $R_1$, $R_2$ are stabilized by appropriate adjustment or monitoring of voltage and current at the resistor connections $A_{R1}$ and $A_{R2}$ at different temperatures $T_1$ and $T_2$, to which specific resistance values correspond, and the powers output by them are measured.

For the power output by heat transfer from a resistor to the wall of a chamber as a function of the gas pressure p therein, the temperature T of the resistor and the wall temperature $T_w$, the following is obtained by the formula known, for example, from H. R. Hidber, G. Süss: "Pirani manometer with linearized response", Rev. Sci. Instrum. 47/8 (1976), 912–914

$$N(p)=\alpha(\epsilon T^4-\epsilon_w T_w^4)+(\beta(T-T_w)/\sqrt{T_w})\times p+\gamma(T-T_w) \qquad (1)$$

Here, the first term relates to the heat transfer by radiation and the last term relates to that by thermal conduction in the region of the connections of the resistor, while the middle term describes, for a range of pressures below 10 mbar which is of particular interest here, the heat transfer caused by the pressure-dependent thermal conduction by the gas. When a somewhat more complicated formula which also takes into account the saturation at higher pressure is used for the dependence of this term on the pressure, this method can also be applied to a substantially larger pressure range without substantial changes.

If N(p) is measured at the two different temperatures $T_1$ and $T_2$ at which the resistors $R_1$, $R_2$ are stabilized, and the difference is calculated, the result is $$N_1(p)-N_2(p)=\alpha\epsilon(T_1^4-T_2^4)+(\beta(T_1-T_2)/\sqrt{T_w})\times p+\gamma(T_1-T_2) \qquad (2)$$

$\alpha$, $\epsilon$, $\beta$ and $\gamma$ are constants. The equation may be summarized as $$N_1-N_2=A+B\times p/\infty T_w \qquad (3)$$

with constants A, B. The wall temperature is included only in the square root $\sqrt{T_w}$, whereas the terms in (1) which are highly dependent on the wall temperature and contain higher powers thereof are absent in (3).

If a standardized pressure P containing the so-called thermal transpiration (cf. in this context K. F. Poulter et al., Vacuum 33 (1983), 311 and W. Jitschin et al., J. Vac. Sci. Technol. A5 (1987), 372) is defined as $$P=p\times\sqrt{(T_{w0}/T_w)} \qquad (4)$$

which, for example at $T_{w0}$=300° K., corresponds to the pressure p, said standardized pressure is obtained as $$P=(N_1-N_2-A)/K \qquad (5)$$

where K is also a constant. P is thus independent of the wall temperature. A second pressure signal is derived from the voltages and currents at the resistor connections $A_{R1}$, $A_{R2}$, according to (5), from the evaluation unit.

The evaluation unit generates, from the first pressure signal originating from the capacitive measuring element and from the second pressure signal originating from the thermal conductivity measuring element, an output signal which in each case corresponds uniquely to a specific measured result of the pressure sensor. In an upper part of the measuring range, the output signal is determined on the basis of the first pressure signal originating from the capacitive measuring element; in a lower part thereof, it is determined on the basis of the second pressure signal originating from the thermal conductivity measuring element. The transition may be abrupt at a transition value, which however can easily lead to jumps in the measured value and hysteresis effects. It preferably occurs steadily in a transition interval, for example between 0.1 mbar and 10 mbar, in particular corresponding to the method described in EP-A-658 755.

Figure 2A:
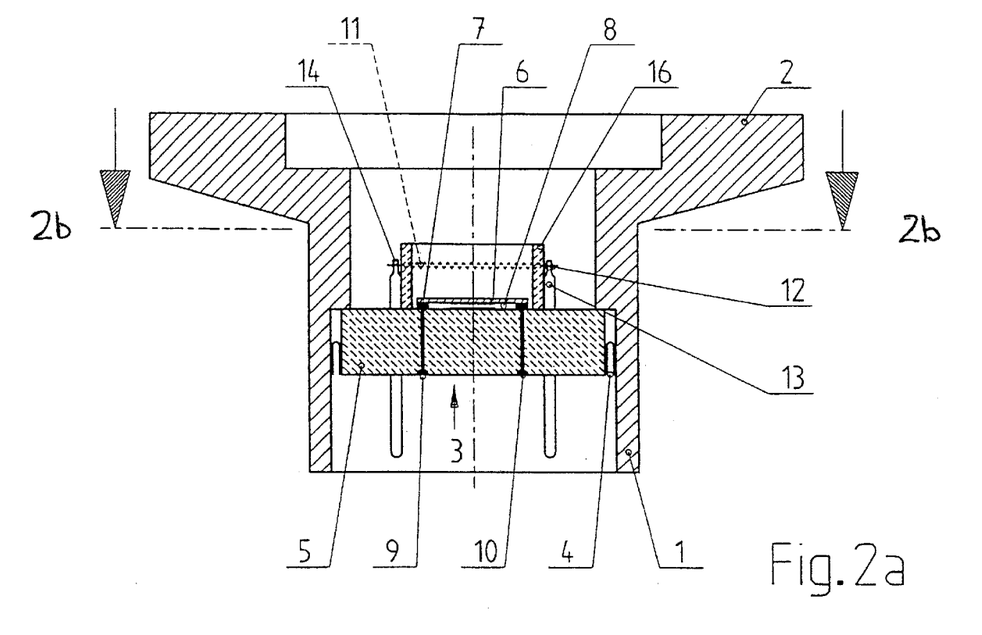
FIG. 2a is an axial longitudinal section through a pressure measuring apparatus according to a first embodiment of the invention, comprising a pressure sensor according to a first embodiment and taken along line 2a—2a of FIG. 2b.
Figure 2B:
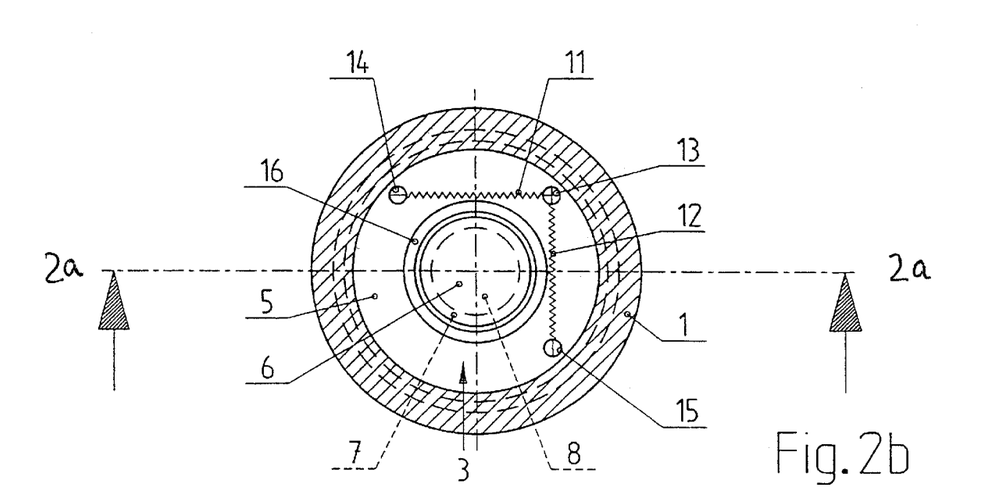

A pressure measuring apparatus according to a first embodiment of the invention is shown in FIG. 2a, b. A pressure sensor 3 according to a first embodiment is suspended elastically and gas-tight, by means of an annular elastic spring 4, at the end of a protective tube 1 having a flange 2, by means of which the protective tube 1 can be connected to a corresponding connection of a chamber. The spring 4 is hard-soldered directly to a support plate 5 of the pressure sensor 3, which simultaneously performs the function of a base member, and is welded to the protective tube 1. It compensates for the different thermal expansions of the protective tube 1 produced from steel and of the support plate 5 which preferably consists of a ceramic containing at least 95% of $Al_2O_3$.

Mounted on the inner surface of the support plate 5, which surface faces towards the interior of the protective tube 1, is a membrane 6 which is connected gas-tight by an all-round glass seal 7 to the support plate 5 and at the same time is a distance away from said support plate, so that it, together with the latter, encloses a reference vacuum 8 which may be gettered. The membrane 6 is preferably produced from a ceramic which preferably contains $Al_2O_3$ or predominantly comprises the latter. Its thickness is preferably between 10 $\mu$m and 1000 $\mu$m, in particular between 10 $\mu$m and 250 $\mu$m. Its diameter is preferably between 2 mm and 15 mm, in particular between 4 mm and 9 mm.

Those surfaces of the support plate 5 and of the membrane 6 which are opposite one another each carry an electrically conducting layer which is connected through the support plate 5 to a connection 9, which corresponds to the earth connection $A_0$, or to a connection 10, which corresponds to the capacitor connection $A_c$, on the outside of said support plate. The support plate 5 and the membrane 6 connected to it thus form the capacitive measuring element, with said electrically conducting layers as capacitor C. In the preferred embodiment where the support plate 5 and the membrane 6 consist of ceramic, the capacitive measuring element formed by them is also resistant in a corrosive atmosphere.

In addition, two heating elements arranged adjacent to the membrane 6 are provided, which constitute the electrical resistors $R_1$, $R_2$ and thus form a thermal conductivity measuring element. They are in the form of measuring wires 11, 12 which diverge approximately at right angles towards holders 14; 15 at a slightly larger distance than the membrane 6, parallel to the inner surface of the support plate 5, starting from a middle holder 13, which is electrically conductively connected to the connection 9. They are preferably produced from nickel, platinum or tungsten or an alloy containing at least one of these metals, so that they themselves are corrosion-resistant with respect to corrosive gases. The holders are connected through the support plate 5 to further connections (not shown) corresponding to the resistor connections $A_{R1}$, $A_{R2}$. The membrane 6 is surrounded by a protective ring 16, for example of ceramic, which protects it from the light and heat radiation emitted by the measuring wires 11 and 12 and prevents said membrane from being heated and consequently the average distance between the electrically conducting layers and hence the value of the capacitance C being influenced.

In the upper part of the measuring range, from about 0.1 mbar to about 10 bar, the measured result is, as explained above, derived wholly or partly from the value of the capacitor C, which is formed by the electrically conducting layers on the support plate 5 and the membrane 6, which layers are separated by the reference vacuum 8. This value depends on the sag of the membrane 6, which in turn is a function of the pressure. Below the lower limit of the range, the effect of the pressure on the sag of the membrane 6 is so small that changes therein are no longer detectable with sufficient accuracy. Consequently, in the lower part of the measuring range, from about $10^{-6}$ mbar to about 10 mbar, the measured result is derived wholly or partly according to the Pirani principle from the powers output by the measuring wires 11, 12. This principle of measurement gives relatively accurate measured results below about 50 mbar, in particular below about 30 mbar.

Various modifications of the pressure sensor described are of course possible. Thus, for example, the boundary between the lower and the upper range can be changed—in particular depending on the design of the membrane. The Pirani pressure measurement can also be carried out with only one heating wire which can be brought alternately to the different temperatures $T_1$, $T_2$ or operates at only one temperature. In the latter case, however, greater effects of the wall temperature must be taken into account. Depending on the field of use, materials other than the stated one can also be used in some cases or, instead of a measuring wire, another resistance heating element, for example a tape, a thin-film arrangement, a microchip or a Pirani element produced by microtechnology on an Si wafer, may also be used.

The support plate may be smaller and may be mounted on a base member preferably likewise consisting of ceramic, preferably a baseplate of larger diameter, through which the electrical connections are led. The protective tube of the pressure measuring apparatus is then closed by the baseplate. Finally, the pressure sensor may also be formed in such a way that it is suitable for relative measurements in the upper part of the measuring range, by providing a hole through the support plate, which hole opens into the volume which lies between said support plate and the membrane and which in this case is not in the form of a reference vacuum.

According to a second embodiment, the pressure sensor, which in principle has an identical design to that according to the first embodiment and corresponds to the circuit diagram shown in FIG. 1, has a separate base member, or more exactly a baseplate 17, which preferably consists of ceramic or another electrically insulating material. The capacitive measuring element comprising the baseplate 5 and the membrane 6 is aligned perpendicular to the baseplate 17, which, for example, can be suspended in accordance with the first embodiment in a protective tube or can be otherwise mounted.

Figure 3A:
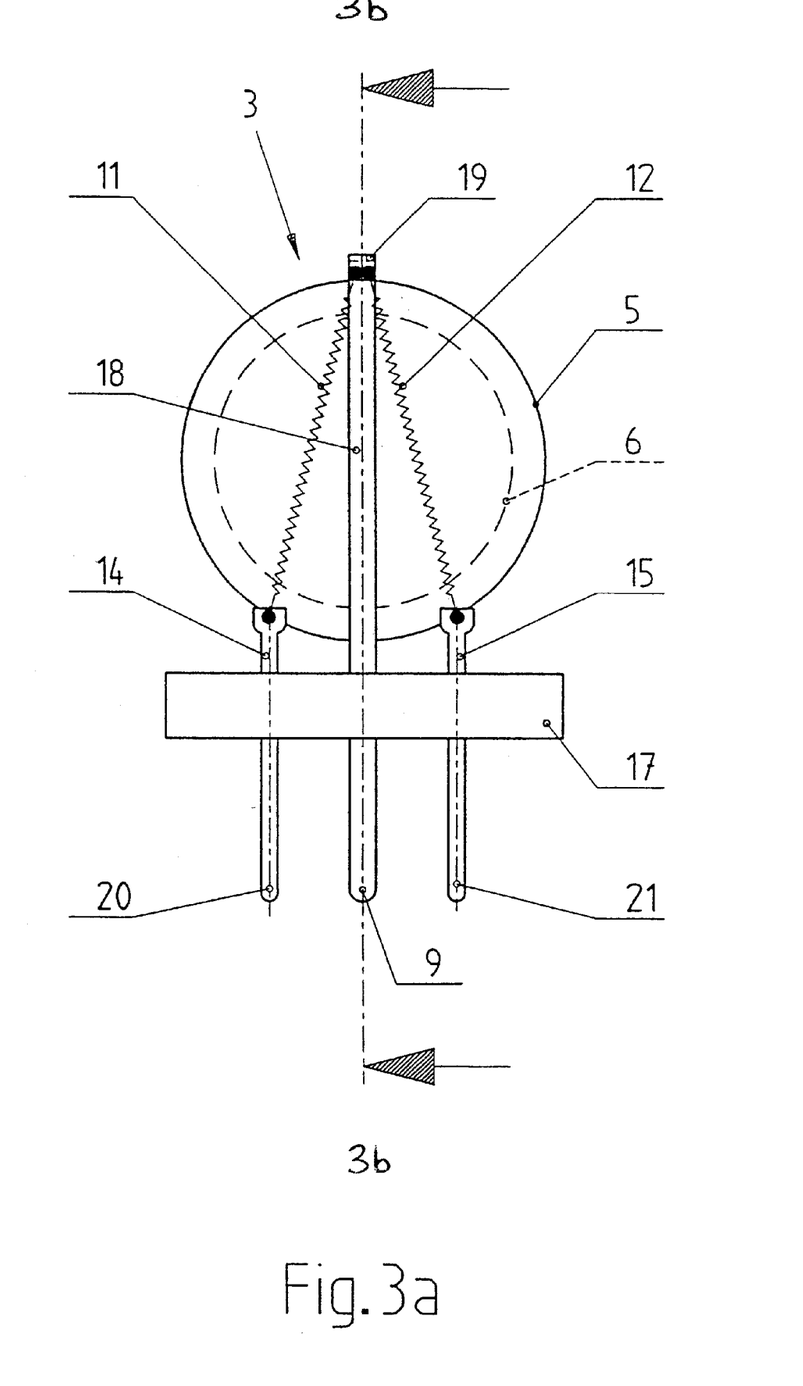
FIG. 3a is a side view of a pressure sensor according to a second embodiment.
Figure 3B:
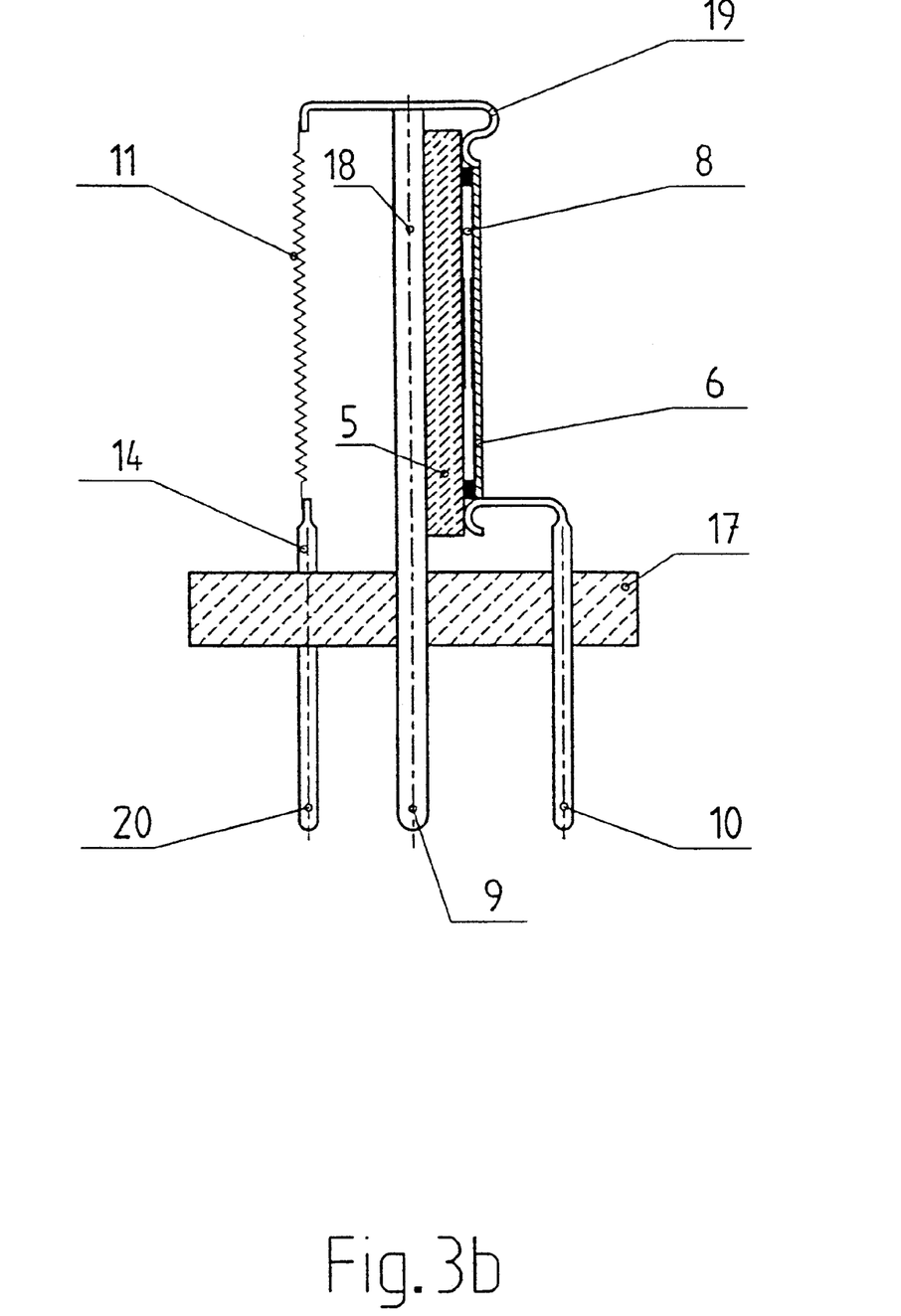
Figure 3C:
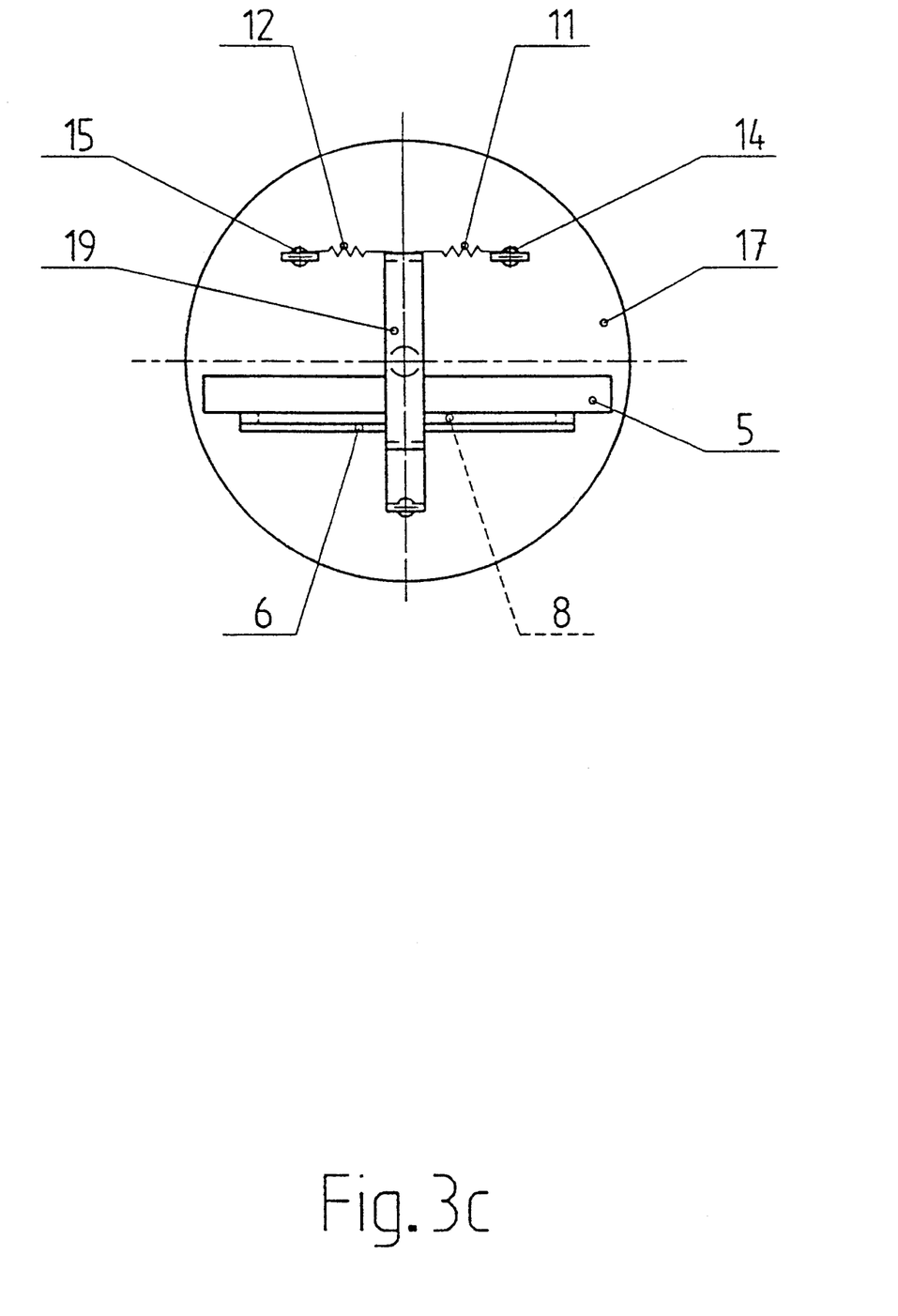
FIG. 3c is a plan view of the pressure sensor according to FIGS. 3a and 3b.

The connection between the baseplate 17 and the support plate 5 is produced by a pin 18 which is passed centrally through the baseplate 17 and is anchored in it. The back of the support plate 5 is fastened to said pin in such a way that it lies along a diameter of said support plate. At the same time, said pin is connected by means of a tab 19 to the electrically conducting layer thereon. Its section projecting through the baseplate 17 forms the connection 9 which corresponds to the earth connection $A_0$. The electrically conducting layer on the membrane 6 is connected by means of a connecting pin passed through the baseplate 17 to the connection 10 which corresponds to the capacitor connection $A_c$.

The measuring wires 11, 12 are arranged on that side of the support plate 5 which faces away from the membrane 6, so that said support plate protects the membrane from thermal effects thereof. They extend in each case from one end of the tab 19, by means of which they are electrically connected to the pin 18, and diverge obliquely towards the baseplate 17, where they are connected to the holders 14, 15.

Here, these are in the form of connecting pins which are passed through the baseplate 17 and which form the connections 20, 21 corresponding to resistor connections $A_{R1}$, $A_{R2}$.

Here too, modifications are of course possible, for example relating to the orientation of the support plate and the mounting of the measuring wires. If relative measurements are to be carried out, a further capacitive measuring element may be mounted on the back of the baseplate. What is important in all embodiments is that the measuring wires are mounted in the vicinity of the membrane, so that they are not exposed to different pressures when pressure gradients occur, but on the other hand do not have an adverse thermal effect on the membrane. For this reason, the distances between the membrane and the measuring wires should not be greater than 5 mm, but also not less than 2 $\mu$m. Shielding, as implemented according to the first embodiment by the protective ring 16 and according to the second embodiment by the support plate 5 itself, is also advantageous.

Owing to their compactness, pressure sensors according to the invention are also very useful as part of pressure measuring apparatuses which are intended for specific purposes and also contain a further measuring element, for example for extending the measuring range downwards or improving the accuracy or stability at low pressures. The pressure sensor is then optionally arranged in each case together with the further measuring element in the protective tube 1.

Figure 4:
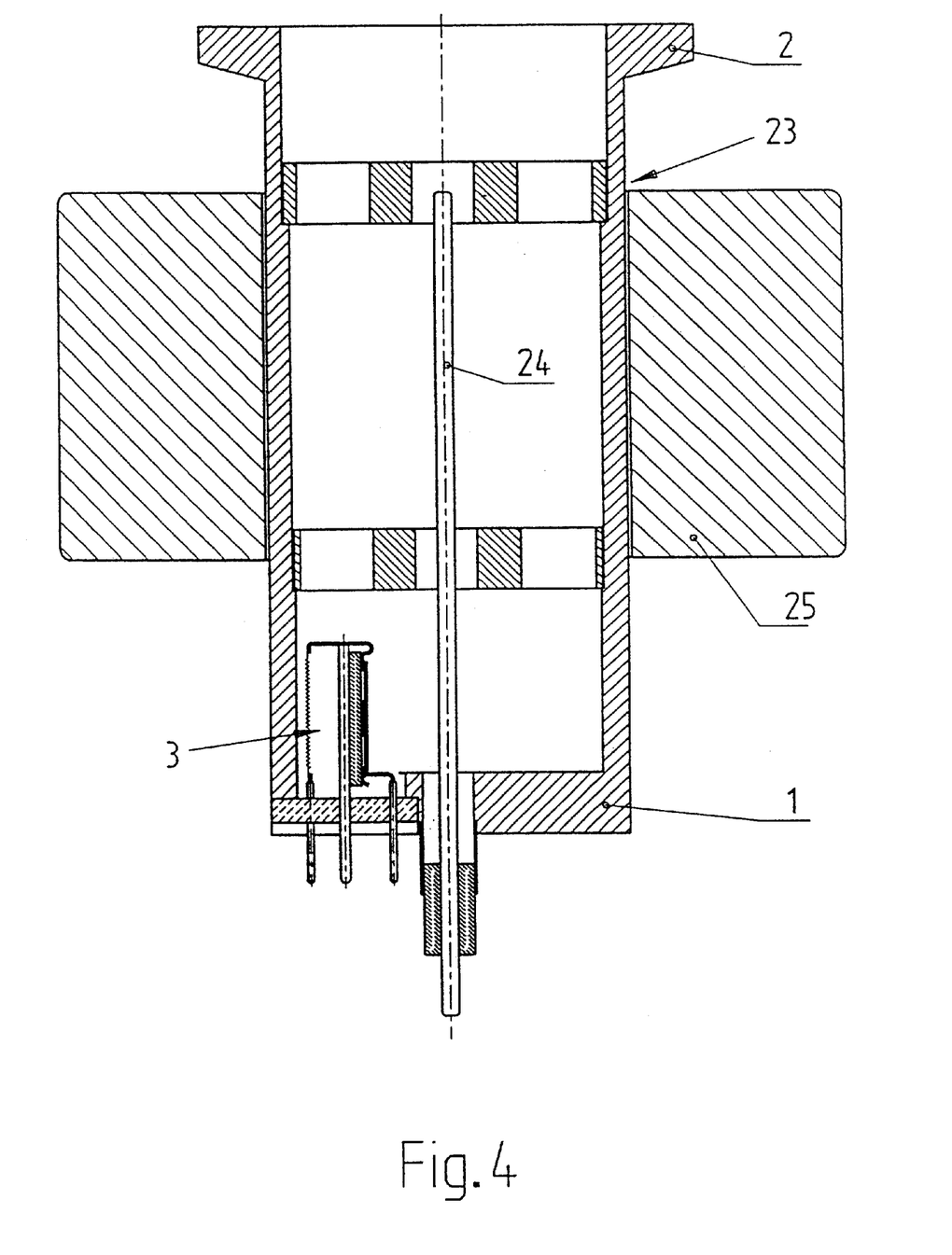
FIG. 4 shows a pressure measuring apparatus according to a second embodiment of the invention, comprising a pressure sensor according to the second embodiment.

Thus, according to a first such embodiment of a pressure measuring apparatus (FIG. 4), a magnetron 23, i.e. a cold-cathode measuring element of a design known per se, is arranged in the protective tube 1, with a pin 24 and a permanent magnet 25 surrounding the protective tube 1 coaxially. An opening is left at the end opposite the open end of the protective tube 1, next to the passage for the pin 24, and is closed by the baseplate 17 of the pressure sensor 3, which corresponds to the second embodiment described above. Such a pressure measuring apparatus has a high accuracy and good long-term stability at low pressures and is suitable, for example, for use in chambers for coating hard discs.

Figure 5:
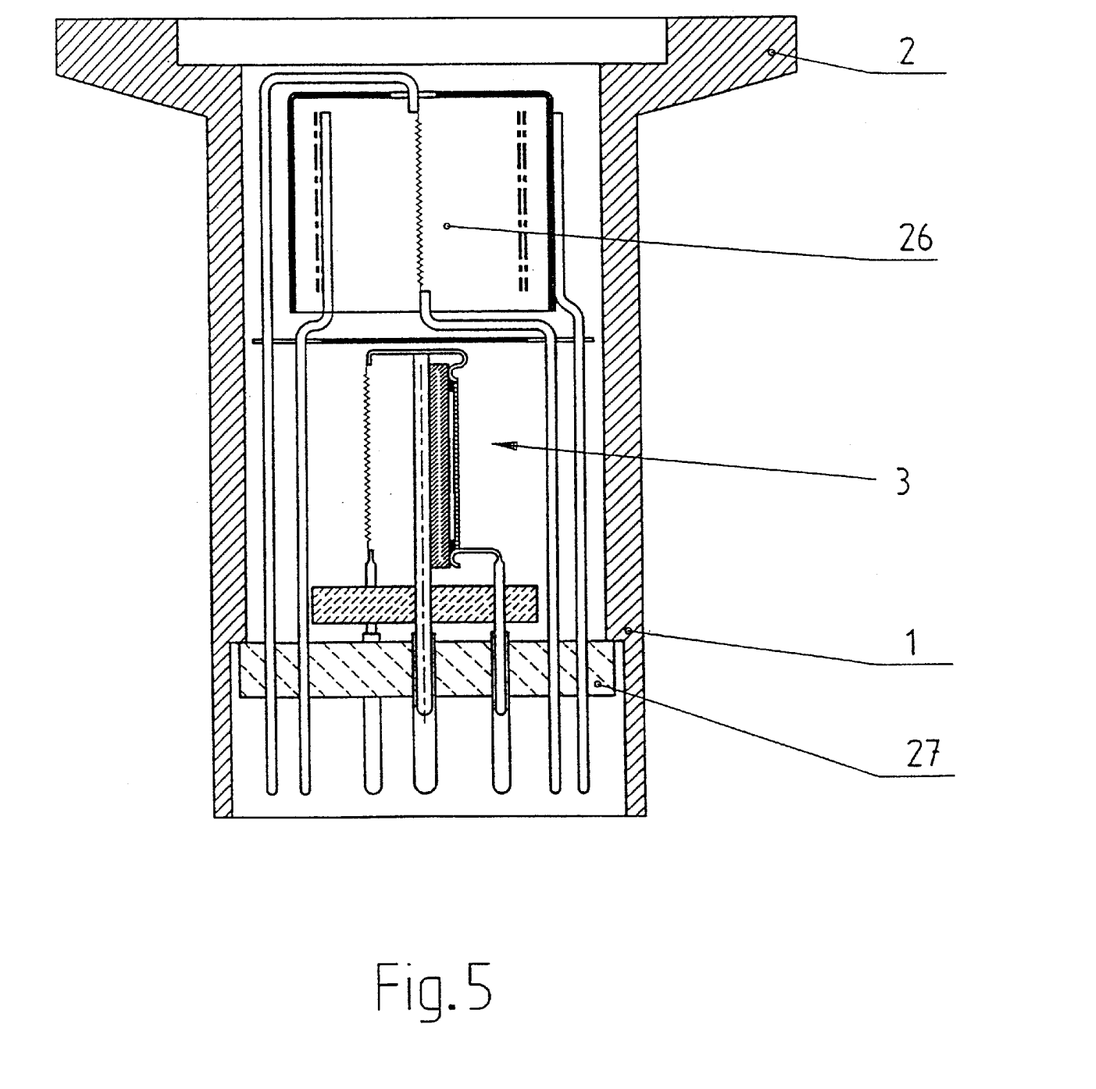
FIG. 5 shows a pressure measuring apparatus according to a third embodiment of the invention, comprising a pressure sensor according to the second embodiment.

A further pressure measuring apparatus (FIG. 5) has a triode 26, a hot-cathode measuring element, in addition to the pressure sensor 3, which once again corresponds to the second embodiment described. The pressure sensor 3 and the triode 26 are mounted on a common retaining plate 27 comprising ceramic or another electrically insulating material, which closes the protective tube 1 at one end and through which the connections of both are led. The triode 26 is offset towards that end of the pressure tube 1 which is surrounded by the flange 2, i.e. said triode is arranged before the pressure sensor 3. As a result of the triode 26, the pressure measuring apparatus is accurate and is very stable in the long term in the range between $10^{-1}$ mbar and $10^{-5}$ or $10^{-6}$ mbar. The triode 26 is also mechanically strong. The pressure measuring apparatus is suitable, for example, for use in chambers for tool coating, which usually have no upstream locks.

Figure 6:
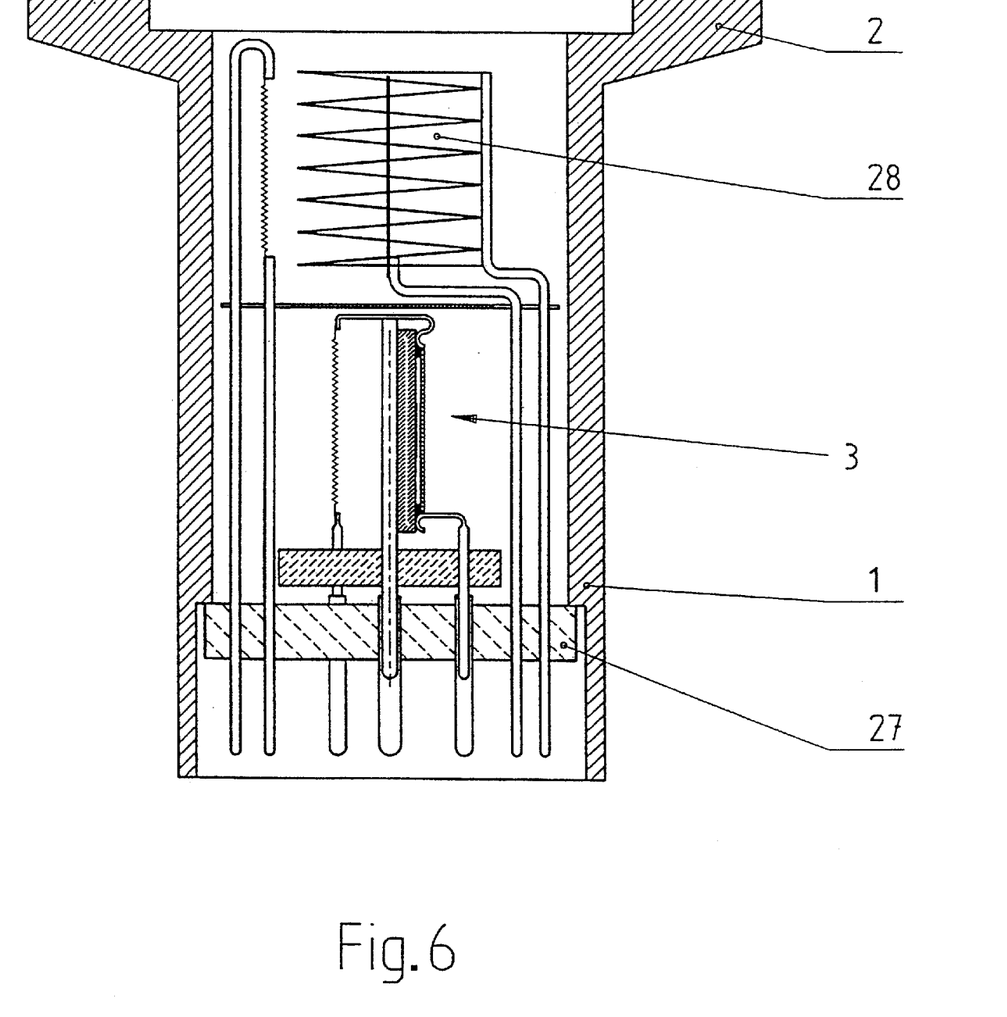
FIG. 6 shows a pressure measuring apparatus according to a fourth embodiment of the invention, comprising a pressure sensor according to the second embodiment.

A further pressure measuring apparatus (FIG. 6) having substantially the same design has, as a hot-cathode measuring element, a Bayard-Alpert element 28 which is distinguished by relatively high robustness with respect to soiling.

In each case, the further measuring element delivers an additional pressure signal, which is likewise fed to the evaluation unit and can be used there as the basis for the determination of the output signal for a specific part of the measuring range. The transition may likewise be abrupt or may take place with a steady superposition.

The advantageous characteristics of pressure sensors according to the invention or pressure measuring arrangements comprising them can be further improved if the offset of the capacitive measuring element, which offset impairs the long-term stability, is frequently compensated. In the monitoring of the pressure in chambers, where said pressure is cyclically changed, this can be effected regularly, for example in a lock 29 of a vacuum unit (FIG. 7) into which articles, for example wafers 30 to be processed or the like, are introduced from outside, i.e. under atmospheric pressure $p_0$ (FIG. 8a), whereupon, after the lock 29 has been closed, the pressure p is reduced to a transfer pressure $p_t$ which may be a few 10 mbar or substantially lower, for example may be about $10^{-4}$ mbar. Thereafter, a valve 31 is opened and, during a transfer interval $I_t$ (FIG. 8b), said wafers 30 are further transported into an intermediate chamber 32, where the pressure was increased beforehand to the transfer pressure $p_t$. After the valve 31 has been closed, the pressure p is increased again to atmospheric pressure $p_0$ in the lock 29, while it is reduced in the intermediate chamber 32 and the wafers 30 are further transported by means of a further valve 33, for example to a processing chamber 34.

Figure 7:
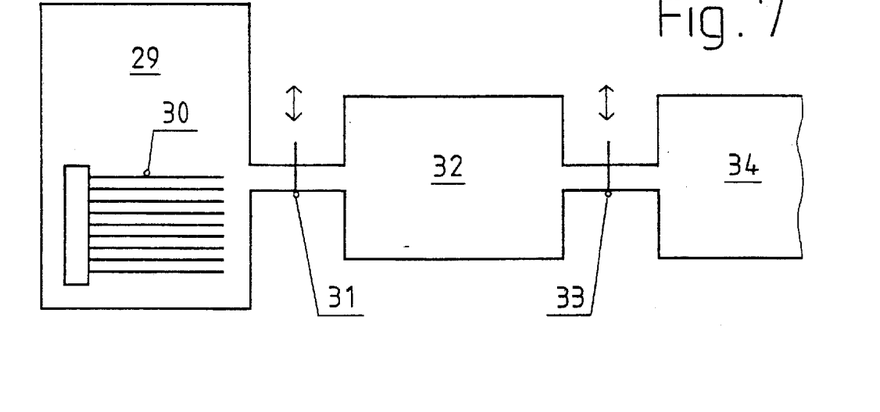
FIG. 7 schematically shows a section of a vacuum unit.

It is very important that the lock 29 is always opened only when the pressure therein has closely approached atmospheric pressure $p_0$—generally to between 2% and 5%, depending on the sensitivity of the articles to be processed—since otherwise troublesome flows are generated and the valves are highly loaded, which may lead to abrasion and corresponding impurities. However, the poor long-term stability due to an offset in the case of the capacitive measuring element which is used in the upper pressure range and otherwise has excellent accuracy can be problematic.

Figure 8A:
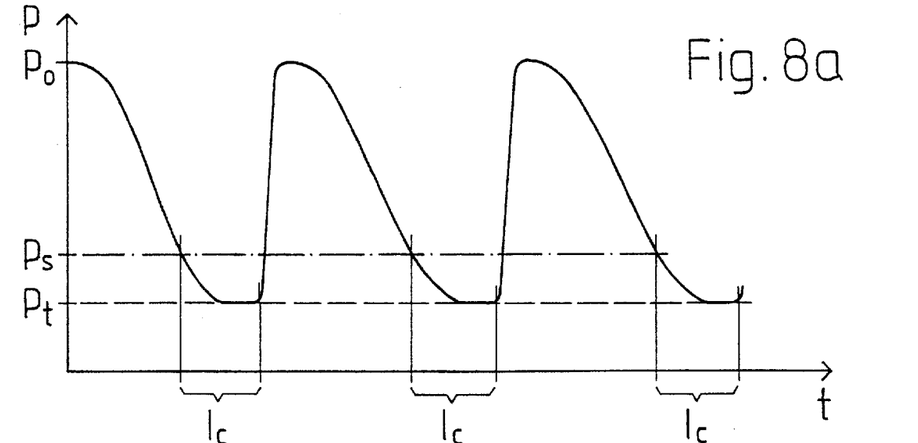
FIG. 8a shows the pressure variation in a lock of the vacuum unit of FIG. 7.
Figure 8B:
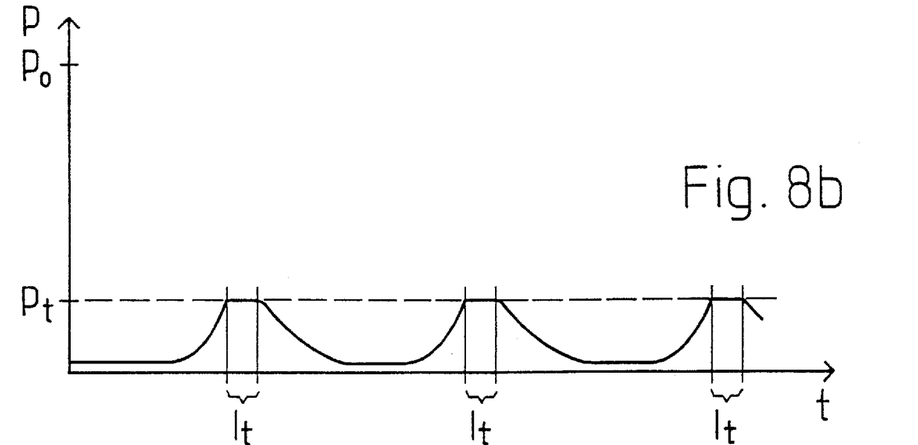
FIG. 8b shows the pressure variation in an intermediate chamber of the vacuum unit of FIG. 7.

This problem is solved by a compensation of the offset as soon as the measured value falls below a threshold value $p_s$, which as a rule is not higher than 100 mbar, preferably not higher than 50 mbar or even 30 mbar. In this case, the output signal determined by the evaluation circuit from the first pressure signal is compared with one determined by said evaluation circuit from the second pressure signal. If deviation due to offset occurs, the characteristic which is used for deriving the first pressure signal is shifted in such a way that the output signal derived from it agrees with the output signal derived from the second pressure signal. This is repeated at intervals or continuously as long as the pressure p continues to decrease. If it begins to increase again, the procedure is terminated. The compensation of the offset is thus effected within a calibration interval $I_c$ (FIG. 8a).

If the lowest pressure reached in the lock 29 is, for example, 5 mbar, the deviation of the measured result according to the thermal conductivity measurement from the actual pressure is as a rule not greater than about 20%, i.e. 1 mbar. The offset of the capacitive measuring element can thus be determined accurately to about 1 mbar. Owing to the otherwise very high accuracy of the capacitive measuring element, the accuracy of measurement in its measuring range is then likewise about 1 mbar, which gives a deviation of about 0.1% at atmospheric pressure. This accuracy is as a rule completely sufficient. If lower pressures are reached in the lock 29, the result is even better. If a relative measurement is carried out using a second capacitive measuring element located outside the lock, which is often advantageous owing to variations in the outside pressure, its output signal can in each case be compared with that of the other measuring element when the lock is open and its offset can also be compensated in this manner.

| List of reference symbols | |
|---|---|
| 1 | Protective tube |
| 2 | Flange |
| 3 | Pressure sensor |
| 4 | Spring |
| 5 | Support plate |
| 6 | Membrane |
| 7 | Glass seal |
| 8 | Reference vacuum |
| 9, 10 | Connections |
| 11, 12 | Measuring wires |
| 13–15 | Holder |
| 16 | Protective ring |
| 17 | Baseplate |
| 18 | Pin |
| 19 | Tab |
| 20, 21 | Connections |
| 23 | Magnetron |
| 24 | Pin |
| 25 | Permanent magnet |
| 26 | Triode |
| 27 | Retaining plate |
| 28 | Bayard-Alpert element |
| 29 | Lock |
| 30 | Wafer |
| 31 | Valve |
| 32 | Intermediate chamber |
| 33 | Valve |
| 34 | Processing chamber |

What is claimed is:

1. A pressure sensor apparatus comprising:
a baseplate;
a support plate mounted to the baseplate;
a capacitive measuring element spaced from and gas-tightly mounted to the support plate, the capacitive measuring element comprising a ceramic membrane having a surface facing the support plate;
electrically conducting layers on the surface of the membrane facing the support plate and on a surface of the support plate facing the membrane, the layers being adapted to be connected to a circuit for capacitively measuring pressure;
a thermal conductivity measuring element with at least one heating element connected to the baseplate adjacent the support plate at a location opposite from the membrane for protecting the membrane from thermal effects of the heating element while keeping the thermal conductivity measuring element near the capacitive measuring element, the heating element being adapted to be connected to a circuit for thermally conductively measuring pressure.

2. A pressure sensor apparatus according to claim 1, wherein the support plate extends substantially perpendicularly from the baseplate.

3. A pressure sensor apparatus according to claim 1, wherein the distance between the membrane and the at least one heating element is not more than 5 mm.

4. A pressure sensor apparatus according to claim 1, wherein the membrane consists of a ceramic which contains $Al_2O_3$ and has a thickness of between 10 μm and 1000 μm.

5. A pressure sensor apparatus according to claim 1, wherein the diameter of the membrane is between 2 mm and 15 mm.

6. A pressure sensor apparatus according to claim 1, wherein a gettered reference vacuum is enclosed between the support plate and the membrane.

7. A pressure sensor apparatus according to claim 1, wherein each heating element is one of a measuring wire, a tape, a thin-film arrangement and a microchip.

8. A pressure sensor apparatus according to claim 1, including at least two said heating elements and means for independently heating the at least two said heating elements.

9. A pressure sensor apparatus according to claim 1, wherein the at least one heating element contains at least 1% of at least one of nickel, platinum and tungsten.

10. A pressure sensor apparatus according to claim 1, wherein the at least one heating element is parallel to the support plate.

11. A pressure sensor apparatus according to claim 1, including a pin passing through the baseplate and approximately perpendicular to the baseplate, the support plate being fastened to the pin.

12. A pressure sensor apparatus according to claim 1, including a protective tube gas-tightly connected to the baseplate and surrounding the support plate, the membrane and the thermal conductivity measuring element.

13. A pressure sensor apparatus according to claim 12, including at least one further measuring element for pressure measurement in the protective tube.

14. A pressure sensor apparatus according to claim 13, wherein the at least one further measuring element is a cold-cathode element.

15. A pressure sensor apparatus according to claim 13, wherein the at least one further measuring element is a hot-cathode element.

16. A pressure sensor apparatus according to claim 15, wherein the hot-cathode is one of a triode and a Bayard-Alpert element.

17. A method for monitoring pressure in a chamber, comprising:
providing a sensor apparatus having a capacitive measuring element connected to a first circuit for producing a first pressure signal corresponding to capacitively measured pressure, a thermal conductivity measuring element connected to a second circuit for producing a second pressure signal corresponding to thermally conductively measured pressure; and
generating an output signal representing a measured result at least when the measured result is above a transition value, on the basis of the first pressure signal and, when the pressure falls below a threshold value, in each case compensating the first pressure signal in such a way that determination of the output signal on the basis of the first pressure signal leads to the same result as determination of the output signal on the basis of the second pressure signal.

18. A method according to claim 17, wherein the compensation of the offset is repeated as long as the pressure is below the threshold value and is decreasing, but not in the case of increasing pressure.

19. A method according to claim 17, wherein the threshold value is not greater than 50 mbar.

20. A method according to claim 17, wherein the output signal is determined, at least when the measured result is below the transition value, on the basis of the second pressure signal.

21. A method according to claim 17, wherein the chamber is a lock.

22. A method for monitoring pressure in a chamber, comprising:
providing a pressure sensor apparatus containing a capacitive measuring element with a support plate and a membrane gas-tightly connected to the support plate, the support plate and the membrane each with an electrically conducting layer, the layers being connected to a first electrical circuit for producing a first pressure signal corresponding to capacitively measured pressure, the pressure apparatus further containing a thermal conductivity measuring element with at least one heating element placed in proximity of the capacitive measuring element, the heating element being connected to a second electrical circuit for producing a second pressure signal corresponding to thermally conductively measured pressure;

generating an output signal representing a measured result, at least when the measured result is above a transition value or transition interval, on the basis of the first pressure signal; and when the pressure falls below a threshold value, compensating any offset of the first pressure signal in such a way that determination of the output signal on the basis of the first pressure signal leads to the same result as determination of the output signal on the basis of the second pressure signal.

23. A method for monitoring pressure in a chamber, comprising:

providing a pressure sensor apparatus containing a capacitive measuring element with a support plate and a ceramic membrane gas-tightly connected to the said support plate, the support plate and the ceramic membrane each carrying an electrically conducting layer, the layers being connected to a first electrical circuit for producing a first pressure signal corresponding to capacitively measured pressure, the pressure apparatus further containing a thermal conductivity measuring element with at least one heating element placed in proximity of the capacitive measuring element in such a way that the membrane is shielded from thermal effects of the same, the heating element being connected to a second electrical circuit for producing a second pressure signal corresponding to thermally conductively measured pressure;

generating an output signal representing a measured result, at least when the measured result is above a transition value or transition interval, on the basis of the first pressure signal; and when the pressure falls below a threshold value, compensating any offset of the first pressure signal in such a way that determination of the output signal on the basis of the first pressure signal leads to the same result as determination of the output signal on the basis of the second pressure signal.

* * * * *